United States Patent [19]

Jones

[11] 4,108,566
[45] Aug. 22, 1978

[54] MECHANIZED CONTOUR-FOLLOWING DRILL MACHINE

[76] Inventor: Everett E. Jones, 3801 S. Oliver, Wichita, Kans. 67210

[21] Appl. No.: 816,530

[22] Filed: Jul. 18, 1977

[51] Int. Cl.² .................... B23B 47/28; B23B 49/02
[52] U.S. Cl. .............................. 408/115 R; 408/88; 408/234
[58] Field of Search .................. 408/3, 88, 89, 115, 408/234, 236, 237

[56] References Cited

U.S. PATENT DOCUMENTS

| 1,991,285 | 2/1935 | Linder | 408/88 |
| 2,053,400 | 9/1936 | Kingsbury | 408/88 X |

Primary Examiner—Travis S. McGehee
Attorney, Agent, or Firm—John H. Widdowson; Edwin H. Crabtree

[57] ABSTRACT

A mechanized contour-following drill machine for drilling and reaming holes in a contoured surface. The machine orienting a drill spindle of a drill assembly perpendicular to a plane tangent to the contoured surface of a work piece so that the center line of the holes drilled therein are perpendicular to the contoured surface.

7 Claims, 11 Drawing Figures

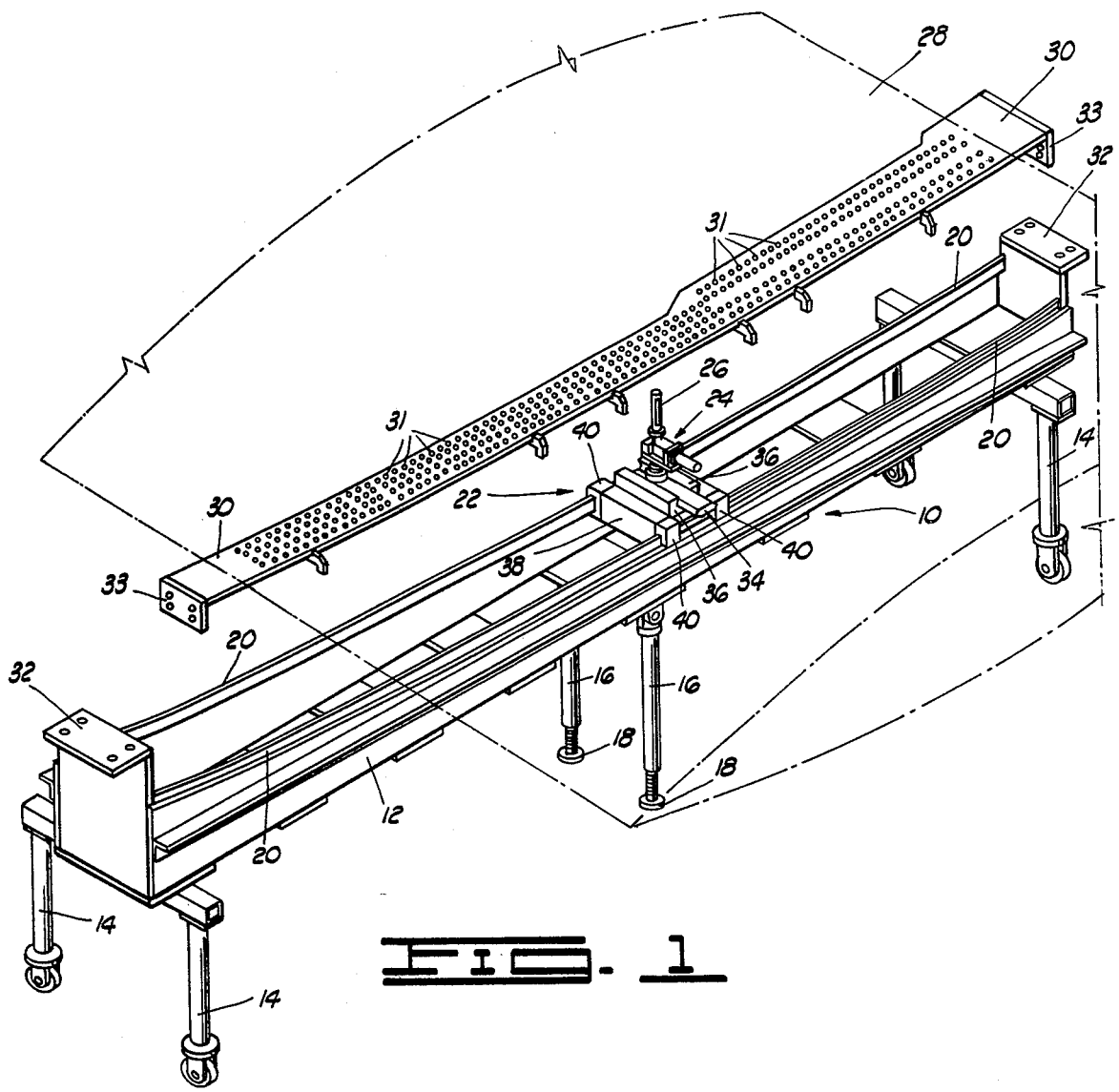
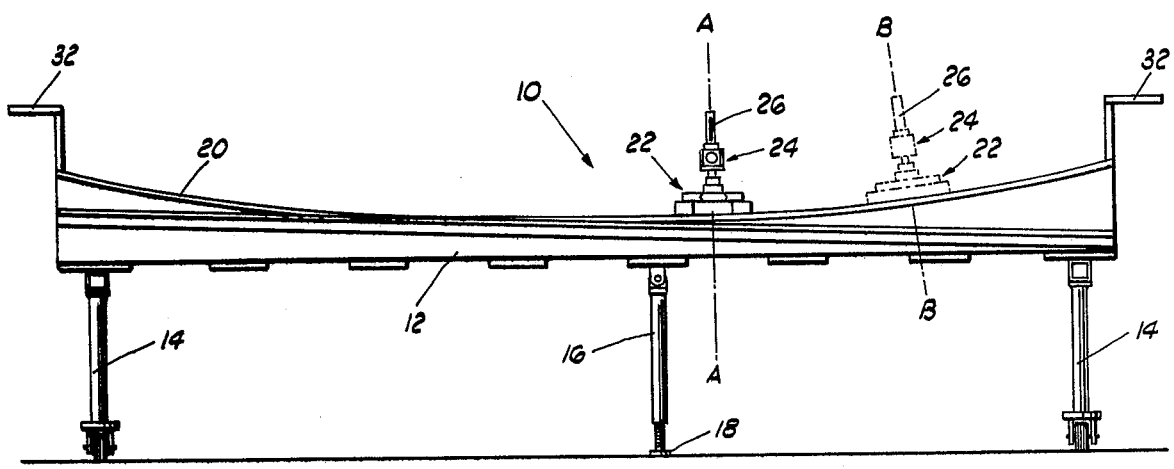

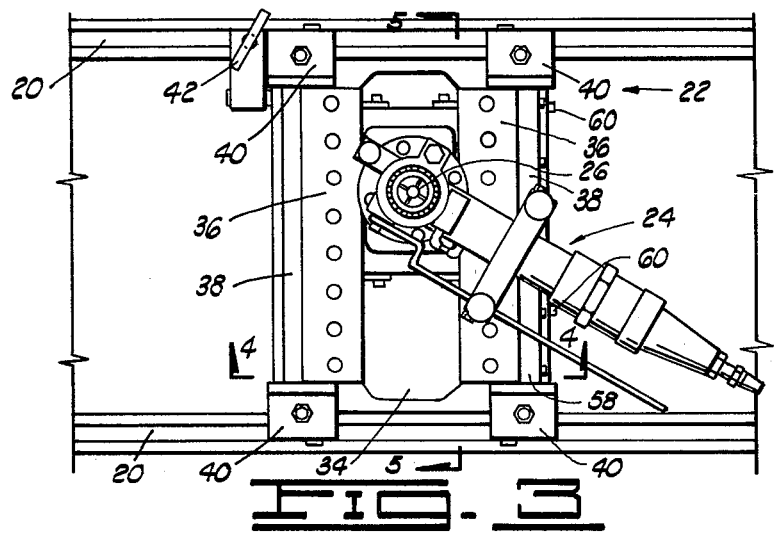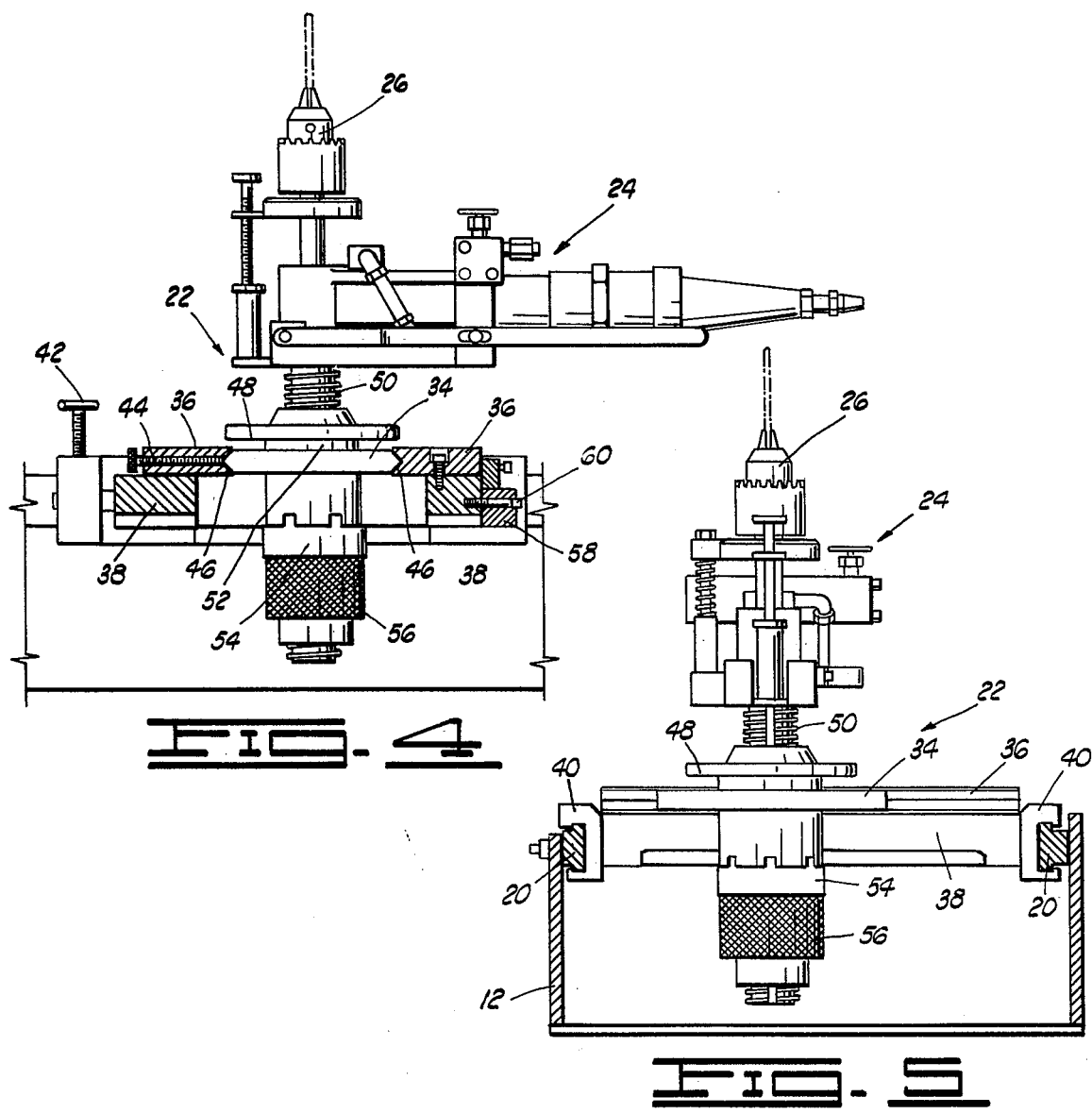

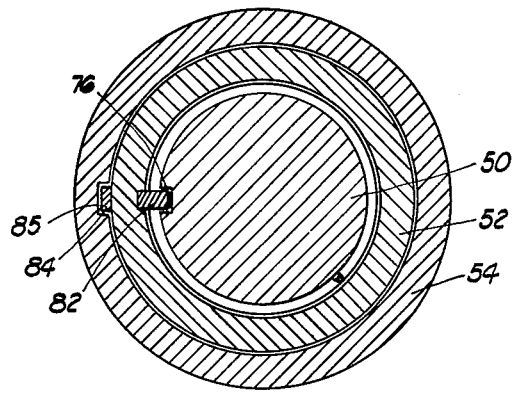
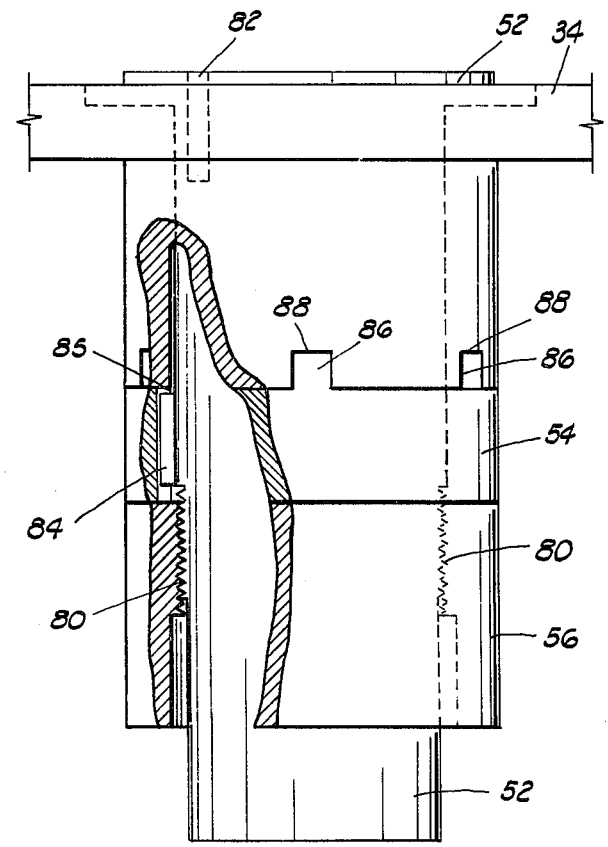
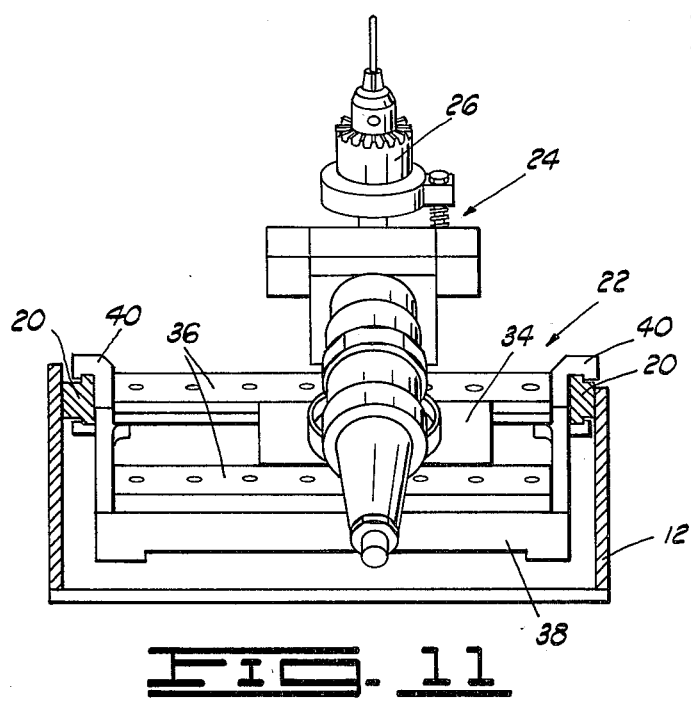

MECHANIZED CONTOUR-FOLLOWING DRILL MACHINE

BACKGROUND OF THE INVENTION

This invention relates generally to a drilling machine and more particularly, but not by way of limitation, to a contour-following drill machine for drilling a plurality of holes used in joining an outboard wing assembly to a center wing section of an aircraft.

Heretofore, the aircraft industry has used a somewhat "standard" approach in accomplishing wing join operations. A drill jig or plate is fabricated and clamped in position on the surface to be drilled. The drilling is accomplished by drilling a large number of fastener holes using the drill jig as a guide and hand holding the drill.

With the development and use of tapered shank fasteners, closer tolerance hole dimensions are required thereby making the joining of the wing assemblies even more difficult. The fastener holes are made by performing a multi-step drilling and reaming operation requiring a plurality of different size drills and reamers.

The joining of composite structures of steel and aluminum used in the wing sections presents major problems in meeting perpendicularity and maintaining surface quality necessary for receiving the tapered shank fasteners. Further, the use of a drill plate on lower wing surfaces necessitates overhead drilling operations which increase the problems of meeting rigged quality standards.

Because of the common problems described above in the standard approach of joining wing sections of an aircraft, the subject invention was developed and described herein.

SUMMARY OF THE INVENTION

The subject invention eliminates the use of hand-held drills thereby reducing operator fatigue. The machine has eliminated the multi-step drilling and reaming operation and has reduced the operation to a single drilling of the hole and reaming the hole to dimension.

The perpendicularity of the drill hole in the contoured surface is continually maintained by the position of a drill assembly mounted on the machine. Hole quality is maintained by the controlled location, feed, and speed of the drill assembly on the machine.

Through the use of the subject invention, significant cost savings have accrued due to the reduction of the breakage of drill bits and reamers and reduction of the number of bits and reamers required by eliminating the multi-step drilling and reaming operation. The grind operations on the drill bits and reamers are no longer required for maintaining production. Also, the man hours required in the wing join operation have been greatly reduced.

The mechanized contour-following drill machine for drilling and reaming holes in a contoured surface includes a drill stand having a pair of parallel contoured rails mounted thereon. The contoured rails are disposed in a spaced relationship to each other on top of the drill stand and receive a saddle assembly therebetween. Mounted on top of the saddle assembly is a drill assembly with a drill spindle. The saddle assembly allows movement of the drill assembly along the length of the contoured rails and in a lateral movement between the parallel rails. The contoured rails correspond to the contour of the surface to be drilled and therefore orient the drill spindle so that the center line of the drill hole is perpendicular to a plane tangent to the contoured surface.

The advantages and objects of the invention will become evident from the following detailed description when read in conjunction with the accompanying drawings which illustrate the preferred embodiments of the invention.

BRIEF DESCRIPTION OF THE DRAWINGS

FIG. 1 illustrates a perspective view of the drilling machine disposed below a portion of a wing section to be drilled.

FIG. 2 is a side view of the drill machine.

FIG. 3 is an enlarged top view of the drill assembly mounted on top of a saddle assembly attached to contoured rails of the drill stand.

FIG. 4 is a sectional view of the saddle assembly taken along lines 4—4 shown in FIG. 3.

FIG. 5 is a sectional view taken along lines 5—5 shown in FIG. 3.

FIG. 9 is a top sectional view through the threaded post, sleeve and connecting ring.

FIG. 10 is a side view with a cutaway portion of the cross-slide, connecting ring and threaded nut used in securing the drill assembly to the saddle assembly.

FIG. 11 is a side view of the drill assembly with the saddle assembly lowered at one end so that the drill assembly may be removed.

DETAILED DESCRIPTION OF THE DRAWINGS

Figure 6:
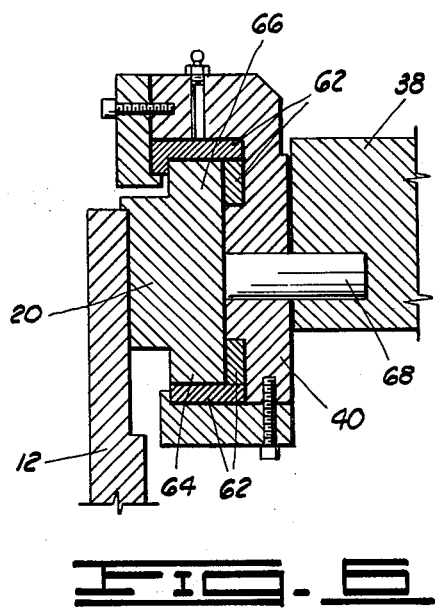
FIG. 6 is an enlarged sectional view of a gib mounted on a portion of the contoured rail.

In FIG. 1, a perspective view of the mechanized contour-following drill machine is shown and designated by general reference numeral 10. The machine 10 includes a drill stand 12 with a plurality of wheel mounted legs 14 mounted at both ends. The stand 12 also includes intermidiate legs 16 having adjustable footpads 18 for adjusting the height of the drill stand 12 and stabilizing the stand 12.

On top of the drill stand 12 is a pair of contoured rails 20 disposed along the length of the stand 12 and in a spaced relationship to each other.

The machine 10 further includes a saddle assembly 22 which is attached to both of the contoured rails 20. Mounted on top of the saddle assembly 22 is a drill assembly 24 with a drill spindle 26 extending upwardly therefrom. The drill assembly 24 may be any standard type of air powered drill or the like used in drilling and reaming holes in a work piece.

Disposed above the drill machine 10 and in a spaced relationship therefrom, is a portion of a wing section 28 shown in dotted lines. While the drilling of drill holes into the wing section 28 is discussed herein, it should be appreciated that the machine 10 could be equally well in any type of drilling and reaming operation on a contoured surface wherein it is desired to drill a plurality of holes with the center line of the holes perpendicular to a plane tangent to the contour of the surface to be drilled.

Mounted adjacent the wing section 28 and between the wing section 28 and the top of the drill stand 12 is a drilling and reaming jig 30 having a plurality of guide holes 31 therein used as a patern for drilling and reaming the holes in the wing section 28.

Ends 33 of the jig 30 are attached to a wing holding assembly which is not shown in the drawings. Also disposed at either end of the drill stand 12 are locating pads 32 which are also used for securing the drill stand 12 to the wing holding assembly so that the drill stand 12 is held in place during the drilling operation.

Also seen in FIG. 1 is the drill assembly 24 mounted on a cross-slide 34 which is guided laterally in a pair of ways 36. By moving the cross-slide 34 in the ways 36, the drill assembly 24 can be moved laterally between the contour rails 20.

The ways 36 are attached to a carriage 38. The carriage 38 is attached to four gibs 40 which are positioned at the corners of the carriage 38 and pivotally attached thereto. By pivotally attaching the gibs 40 to the carriage 38, the saddle assembly 22 is able to follow the contoured surface along the length of the rails 20.

It should be noted that the contoured surface of the rails 20 conform with the contoured surface of the lower portion of the wing section 28. Therefore, as the saddle assembly 22 is moved along the rails 20, the drill spindle 26 is maintained at an angle perpendicular to a plane tangent to the surface to be drilled on the bottom of the wing section 28.

In FIG. 2, a side view of the drill machine 10 is illustrated wherein the drill spindle 26 has a center line shown by dotted lines A—A. In this position, the center line A—A will provide the correct position for drilling a drill hole perpendicular to the contoured surface of the wing section 28 disposed dirrectly above the drill spindle 26. The saddle assembly 22 and drill assembly 24 are also shown in dotted lines with the drill spindle 26 having a center line B—B which again will conform to the corresponding contour of the wing section 28 above the drill spindle 26.

In FIG. 3, a top view of the saddle assembly 22 is illustrated mounted on a portion of the parallel contoured rails 20. In this view, the drill assembly 24 can be seen disposed on top of the cross-slide 34 which is guided between the pair of ways 36. Also seen are the gibs 40 mounted at the corners of the carriage 38. A first screw clamp 42 is attached to one side of the carriage 38 and is used for securing the saddle assembly 22 in place on the rails 20.

In FIG. 4, a sectional view of the saddle assembly 22 is shown taken along lines 4—4 shown in FIG. 3. In this view, a second screw clamp 44 is shown through a portion of one of the ways 36 wherein the clamp 44 can be tightened against the edge of the "V" shaped edges 46 of the cross-slide 34 so that the cross-slide 34 may be held in place in the ways 36. When the clamp 44 is loosened, the cross-slide 34 is free to slide laterally with the drill assembly 34 thereon. This lateral movement allows the drill operation to drill a plurality of holes by moving the drill assembly 24 across the width of the drill stand 12.

The drill assembly 24 may be adjusted vertically on the cross-slide 34 by turning a threaded adjusting wheel 48 which is threadably connected to a threaded post 50 mounted at the bottom of the drill assembly 24 and extending downwardly therefrom.

Figure 8:
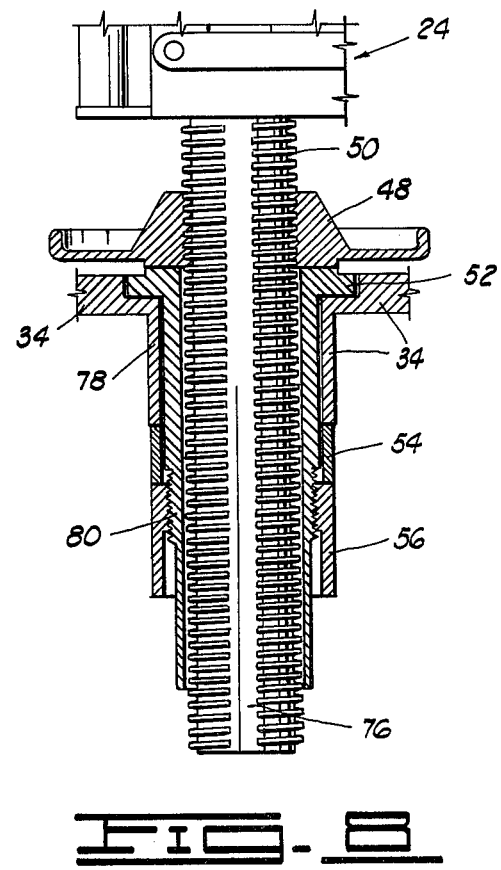
FIG. 8 is a sectional view of a threaded nut, sleeve, and cross-slide used in adjusting the height of a threaded post mounted to the bottom of the drill assembly.

The torque of the drill assembly 24 is transmitted to the cross-slide 34 by keying the threaded post 50 to a sleeve 52 which is slidably received in the cross-slide 34 and shown more clearly in FIG. 8. The sleeve 52 is secured to the cross-slide 34 by a connecting ring 54 and a threaded nut 56.

In FIGS. 3 and 4, it should be noted that the gibs 40 on the right hand side of the carriage 38 are attached to a crossbar 58. By loosening screws 60 which secure the crossbar 58 to the right hand side of the carriage 38, the crossbar 58 with gibs 40 attached thereto may be moved on the rails 20 to the right so that the saddle assembly 22 may be pivoted downwardly to facilitate the removal of the drill assembly 24 from the cross-slide 34. This position of tilting the saddle assembly 22 is illustrated in FIG. 11.

In FIG. 5, a side sectional view of the drill stand 12 is seen along lines 5—5 shown in FIG. 3. In this illustration the gibs 40 can be seen engaging the contoured rails 20. The gibs 40 are characterized by having a "U" shape for engaging both the top and bottom of the rails 20.

In FIG. 6, a sectional view of the gib 40 engaging a portion of the contoured rail 20 is illustrated. The "U" shaped gib 40 includes a bearing surface 62 for engaging a top portion 64 and a bottom portion 66 of the rail 20. The bearing surface is made of nylon, teflon, or any similar bearing material for ease in sliding the gib 40 along the contoured surface of the rail 20.

The gib 40 is pivotally connected to the carriage 38 by a pivot pin 68. By allowing the gib 40 to pivot on the carriage 38, the saddle assembly 22 is allowed to be easily guided on the contoured surface of the rails 20.

Figure 7:
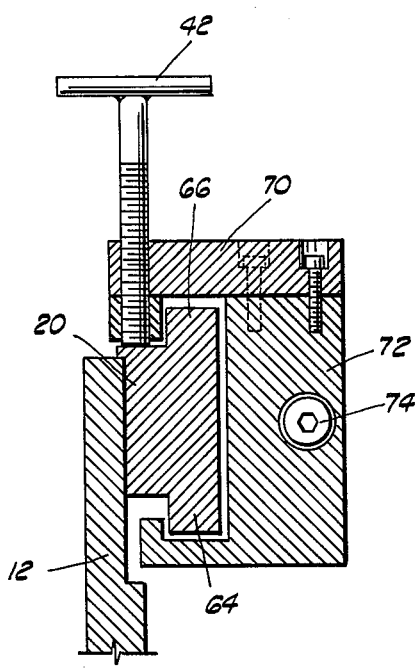
FIG. 7 is a sectional view of a screw clamp used for securing the saddle assembly to the contoured rails.

In FIG. 7, a side sectional view of the first screw clamp 42 is illustrated engaging a portion of the rail 20 for securing the saddle assembly 22 to the rail 20. The first screw clamp 42 is mounted on a clamp plate 70 which is attached to a clamp guide 72. The guide 72 has a similar shape to the gib 40 but does not engage the lower portion 64 and upper portion 66 of the rail 20. The guide 72 is secured to the side of the carriage 38 by a threaded screw 74.

In FIG. 8, a side sectional view of the cross-slide 34, sleeve 52, connecting ring 54 and threaded nut 56 is illustrated. Disposed along the length of the threaded post 50 is an elongated key slot 76 which is used for engaging a key 82 in the interior circumference of the sleeve 52 and shown in FIG. 9. In this view, the threaded wheel 48 can be seen disposed above the hollow sleeve 52 which is received in an aperture 78 in the cross-slide 34. The drill assembly 24 can be raised and lowered by rotating the threaded wheel 48 on top of the sleeve 52. The sleeve 52 extends downwardly and includes a threaded center portion 80 which is used for threadably receiving the threaded nut 56. By tightening the threaded nut 56 on the sleeve 52, the top of the threaded nut engages the lower portion of the connecting ring 54 and tightens the connecting ring 54 against the lower portion of the cross-slide 34. The engagement of the connecting ring 54, sleeve 52, and cross-slide 34 is discussed in greater detail in the description of FIG. 10.

In FIG. 9, a top sectional view of the threaded post 50, sleeve 52, and connecting ring 54 is illustrated. In this view, a first key 82 can be seen attached to the interior circumference of the sleeve 52 and engaged in the key slot 76 of the threaded post 50. The sleeve 52 also includes a second key 84 mounted on the exterior circumference of the sleeve 52 and engaging a key slot 85 in the inner circumference of the connecting ring 54. When the drill assembly 24 is in use, the torque of the drill wants to turn the drill assembly 24 on top of the saddle assembly 22. The drill assembly 24 is held in place by transmitting the torque of the drill assembly 24 through the threaded post 50 which is keyed to the sleeve 52. As mentioned above, the sleeve 52 is keyed to the connecting ring 54 which engages the cross-slide 34 and held in place by the threaded nut 56.

In FIG. 10, a side view of the cross-slide 34, connecting ring 54, and threaded nut 56 is illustrated with a cutaway portion shown to illustrate the key 84 used for engaging the connecting ring 54. By loosening the threaded nut 56 from the threaded center portion 80 of the sleeve 52, the connecting ring 54 is disengaged from the cross-slide 34. The connecting ring 54 engages the cross-slide 34 by male knodes 86 which extend upwardly from the top of the connecting ring 54 and are slidably received in female knodes 88 in the bottom of the lower portion of the cross-slide 34.

In FIG. 11, the drill assembly 24 is illustrated in a tilted position on top of the saddle assembly 22. As discussed in FIG. 4, a pair of the gibs 40 mounted on opposite rails 20 have been removed by loosening the nuts 60 securing the crossbar 58 to the carriage 38 and moved forward and away from the saddle assembly 22 so that the saddle assembly 22 may be pivoted downward. This tilted position of the saddle assembly 22 is used because of the confined area between the top of the drill stand 12 and the contoured surface of the wing section 28. By loosening the threaded nut 56 and removing the connecting ring 54 from the cross-slide 34, the threaded post 50 and attached drill assembly 24 can be quickly lifted upwardly from the sleeve 52 and the drill assembly 24 may be replaced or repaired.

Changes may be made in the construction and arrangement of the parts or elements of the embodiment as disclosed herein without departing from the spirit or scope of the invention as defined in the following claims.

I claim:

1. A mechanized contour-following drilling machine, the machine orienting a drill spindle of a drill assembly perpendicular to a plane tangent to a contoured surface to be drilled, the machine comprising:
   a drill stand;
   a pair of parallel rails disposed in a spaced relationship from each other and mounted on top of said stand, said rails contoured to correspond with the contoured surface to be drilled which is disposed adjacent thereto; and
   means for supporting the drill spindle of the drill assembly on top of said rails and perpendicular thereto, and guiding the drill assembly along the length of said rails, and laterally between said rails.

2. The machine as described in claim 1, wherein said means for supporting and guiding the drill assembly on said rails includes:
   a carriage disposed between said rails;
   a plurality of gibs pivotally attached to said carriage, said gibs slidably engaging said rails and guiding said carriage along the length of said rails;
   a pair of ways mounted on top of said carriage and perpendicular to said rails; and
   a cross-slide disposed between said ways and slidably engaging said ways, said cross-slide receiving said drill assembly thereon and guiding the drill assembly laterally between said rails.

3. A mechanized contour-following drilling machine, the machine orienting a drill spindle of a drill assembly perpendicular to a plane tangent to a contoured surface to be drilled, the machine comprising:
   a drill stand;
   a pair of parallel rails disposed in a spaced relationship from each other and mounted on the top of said stand, said rails contoured to correspond with the contoured surface to be drilled which is disposed adjacent thereto;
   a cross-slide disposed between said rails and receiving the drill assembly thereon;
   a pair of ways, said ways slidably engaging the sides of said cross-slide for guiding the cross-slide laterally and perpendicular to the length of said rails;
   a carriage disposed between said rails and supporting said ways thereon; and
   a plurality of gibs pivotally mounted on said carriage, said gibs engaging said rails and guiding said carriage along the length of said rails.

4. The machine as described in claim 3, further including a screw clamp attached to the side of said carriage and releasably engaging one of said rails for holding the drill assembly in a fixed position on said drill stand.

5. The machine as described in claim 3, further including adjustment means attached to said cross-slide and engaging the bottom of the drill assembly for adjusting the drill assembly along a line which is perpendicular to a plane tangent to the contoured surface to be drilled.

6. The machine as described in claim 5 wherein said adjustment means includes:
   a threaded post attached to the bottom of the drill assembly and extending downwardly therefrom;
   a hollow sleeve received in an aperture in said cross-slide, said sleeve receiving a portion of said post therein; and
   a threaded adjusting wheel disposed on top of said sleeve and threadably engaging said post for raising and lowering said post on said cross-slide.

7. The machine as described in claim 6, wherein the drill assembly is prevented from turning on said cross-slide during the drilling operation and held in place thereon by a first key mounted on the interior circumference of said sleeve and engaging an elongated key slot along the length of said post, and a second key mounted on the exterior circumference of said sleeve and engaging a locking ring, said locking ring releasably engaging said cross-slide.

* * * * *